United States Patent [19]
Gorrell et al.

[11] Patent Number: 5,563,510
[45] Date of Patent: Oct. 8, 1996

[54] VARIABLE RELUCTANCE SENSOR HAVING HERMETICALLY SEALED HOUSING AND DAMPING ELEMENT

[75] Inventors: Todd A. Gorrell, Angola; Gregory P. Gerber, Hudson, both of Ind.

[73] Assignee: Component Sales & Consultants, Inc., Fort Wayne, Ind.

[21] Appl. No.: 420,032

[22] Filed: Apr. 11, 1995

[51] Int. Cl.⁶ .............................. G01P 3/488; G01B 7/30; H05K 5/06; H01F 27/30
[52] U.S. Cl. .................. 324/174; 174/52.3; 324/207.15; 336/92
[58] Field of Search .................... 324/173, 174, 324/207.15, 207.16; 310/155, 168; 73/660, 661; 336/92, 98, 110, 221; 174/52.1, 52.3

[56] References Cited

U.S. PATENT DOCUMENTS

| | | | |
|---|---|---|---|
| 3,614,615 | 1/1971 | Cass | 324/161 |
| 3,793,545 | 2/1974 | Leiber | 310/168 |
| 4,024,484 | 5/1977 | Tomczak | 336/30 |
| 4,045,738 | 8/1977 | Buzzell | 324/174 |
| 4,166,977 | 9/1979 | Glauert | 324/173 |
| 4,268,771 | 5/1981 | Lace | 310/155 |
| 4,419,646 | 12/1983 | Hermle | 336/90 |
| 4,529,933 | 7/1985 | Bleeke | 324/173 |
| 4,596,973 | 6/1986 | Form | 336/96 |
| 4,626,781 | 12/1986 | Forkel | 324/174 |
| 4,647,892 | 3/1987 | Hewitt | 336/83 |
| 4,652,818 | 3/1987 | Buchschmid | 324/174 |
| 4,680,543 | 7/1987 | Kohn | 324/207.15 |
| 4,683,402 | 7/1987 | Aubrey | 315/56 |
| 4,700,133 | 10/1987 | Day | 324/207.15 |
| 4,829,245 | 5/1989 | Echasseriau | 324/174 |
| 4,847,557 | 7/1989 | Saito | 324/207.13 |
| 4,849,728 | 7/1989 | Goll | 336/92 |
| 5,016,343 | 5/1991 | Schutts | 29/605 |
| 5,021,737 | 7/1991 | Schutts | 324/207.11 |
| 5,032,790 | 7/1991 | Johnson | 324/174 |
| 5,039,942 | 8/1991 | Buchschmid | 324/174 |
| 5,121,056 | 7/1992 | Onishi | 324/207.15 |
| 5,278,496 | 1/1994 | Dickmeyer et al. | 324/174 |
| 5,381,089 | 1/1995 | Dickmeyer | 324/174 |

*Primary Examiner*—Sandra L. O'Shea
*Assistant Examiner*—Jay M. Patidar
*Attorney, Agent, or Firm*—Baker & Daniels

[57] ABSTRACT

A variable reluctance sensor including a close-ended hollow housing which contains and thereby protects the operative components of the sensor. The sensor includes a bobbin portion interconnected with a connector member attachable to a submersible connector. An elongated pole piece extends through a bore in the bobbin barrel and press fits into a cavity in the connector member. A magnet is disposed at the end of the pole piece, and a magnet wire coil is wound around the bobbin barrel and electrically connected with conductors in the connector member. An outer hollow housing, which surrounds the bobbin portion, includes an open end portion which is ultrasonically welded to the connector member. After ultrasonic assembly of the housing to the connector member, the magnet rests against the opposite, close-ended portion of the housing. In an alternative embodiment, the housing and bobbin portion may be keyed to ensure proper assembly, and further a leaded sensor may be provided.

20 Claims, 4 Drawing Sheets

VARIABLE RELUCTANCE SENSOR HAVING HERMETICALLY SEALED HOUSING AND DAMPING ELEMENT

BACKGROUND OF THE INVENTION

The present invention relates generally to packaged electronic sensors, and more particularly to packaged electromagnetic type pickups, also known as magnetic pickups, magnetic sensors, speed sensors, or more accurately variable reluctance sensors. Such sensors are used to measure the rotational speed or the position with respect to a fixed reference of a ferrous exciter rotor or reluctor wheel.

Variable reluctance speed and position sensors are well-known and widely used in automotive applications. A general theory of variable reluctance sensor operation is explained in, for example, U.S. Pat. No. 3,614,615, issued to Cass, and U.S. Pat. No. 4,045,738, issued to Buzzell.

The early automotive applications of variable reluctance sensors were for inputting of speed information for electronic speedometers and tachometers on heavy and medium duty trucks and off-road equipment (agricultural, construction, and recreational). The speed sensors were also used to supply wheel speed information for antiskid braking systems for heavy trucks. In general the sensors comprised a plastic bobbin which housed the magnetic elements (pole piece and magnet) and magnet wire. The bobbin assembly was encapsulated into a metal or plastic housing via injection molding of thermoplastic resins or via transfer molding of thermosetting resins, or the encapsulating material itself served to house the bobbin assembly. The encapsulating process frequently caused damage to the magnet wire which resulted in an "open circuit" failure condition early in field service as temperature cycling caused the damaged magnet wire to break (open circuit).

More recently, applications for variable reluctance sensors have increased. With the advent of more aerodynamic vehicles and the use of four and six cylinder engines at higher rpm's to attain power levels of eight cylinder engines as well as to achieve improved fuel economy, the under hood temperatures are higher. The mounting locations for these sensors in the new applications place them in transmission fluid, engine oil, hydraulic fluid, and salt water which are corrosive materials or carriers of corrosive agents used in the manufacture (machining) of metal parts. Together with longer warranty objectives, these harsher environmental conditions have required more difficult and more accelerated life testing for sensor design validation.

As automotive O.E.M.'s continue to look for ways to meet government mandates for emission levels and fuel consumption and to provide improved vehicle performance and safety to consumers, usage of variable reluctance sensors is mushrooming. Some applications include but are not limited to: direct sensing crankshaft-position for spark timing in distributorless ignition systems; direct sensing camshaft position for timing of sequential fuel injection systems; speed input of information for antilock braking systems, electronically controlled transmissions, automatic all wheel drive systems, traction control, as well as the previously mentioned input speed information for instrumentation (vehicle speed and engine speed); and direct sensing of camshaft position for variable camshaft timing systems designed to improve engine horsepower while simultaneously reducing emissions and fuel consumption.

A need for improved sensor reliability and design life is necessitated by the ever increasing warranty periods with targets for warranties out to 100,000 to 200,000 miles as well as by the critical nature of functions performed on vehicles by the sensors as described above. Failure of the variable reluctance sensor will result in vehicle non-operation, safety risk, or poor engine performance in emission control or fuel consumption.

As the warranty periods and use of variable reluctance sensors for critical functions increase, the latent failure modes as well as early failure modes of variable reluctance sensors must be addressed. All the while, the environmental conditions imposed upon these sensors are becoming more demanding.

Further, the output (threshold voltages) requirements are increasingly more difficult to meet because the package size available for the sensors is shrinking with smaller and lighter vehicles. Also, with emission requirements becoming tighter and even required during engine start-up, ignition timing must be achieved during engine start-up which means the same sensor output must be attained at lower exciter gear speeds. This translates to less propensity to induce voltage since the lower the speed of the exciter gear the less the propensity of a given system to induce voltage in a given sensor.

Together with the more critical nature of the applications and the harsher environments, much work has been done to reduce the encapsulation damage to the magnet wire, such as lower molding pressures and/or a provision of protective layering or shielding between the coil and encapsulant. Progress has been made in reducing failure rates; however, the open circuit condition still exists as a result of differing thermal expansion rates of the encapsulant and magnet wire or as a result of the transmission of encapsulant pressure damage through or around the protective layer.

Sealing from liquid intrusion must be provided at all points or surfaces on a variable reluctance sensor including the back and rear end (cable or connector end) of a sensor in applications where complete submersion is possible or where corrosive liquid splash or spill is possible. Many approaches have been taken to seal off the intrusion of corrosive liquids into the sensor. None have been successful in solving the open circuit condition resulting from encapsulation/thermal cycling damage and the sealing off of corrosive liquid intrusion, without sacrificing the output capability of the sensor.

In U.S. Pat. No. 4,680,543, issued to Kohen, a sleeve-like molded plastic cover surrounds the spool (coil), and the magnetic element abuts the inner surface of the cover wall. Further, an encapsulation occupies the spaces within the cover. The thickness of the cover wall increases the working air gap between the exciter rotor and the sensor magnetic element thereby reducing output capability. Also, the sensor coil is still subject to encapsulation/thermal cycle damage to the magnet wire coil. Lastly, although the cover seals off liquid intrusion at the sensing side of the sensor, the design does not provide for an adequate seal from liquid intrusion via the cable.

In U.S. Pat. No. 4,847,557, issued to Saito, et al., the sensor element is covered by a first thermosetting resin inside a case, wherein a second thermoplastic resin hermetically seals the opening in the case. One of the problems with this design is that it does not enable the use of a high coercive force rare earth magnet and thereby does not maximize the output capacity of the sensor. Further, encapsulants are utilized to form seals. In addition to causing magnet wire damage (sensor failure) during thermal cycling, encapsulants have proven to be an ineffective sealing medium during thermal shock or thermal cycles/submersion testing. In other words, this sealing approach has not been sufficient to eliminate intrusion of corrosive liquid into the sensor because the differing thermal expansion rates of the different materials cause any encapsulated material adhesion (sealing) to separate during thermal cycling, thereby creating a leak path.

Although Saito, et al. attempts to employ a seal ring between the bracket and the housing to overcome the separation phenomenon described above, the seal ring only provides a seal for one of three leak paths. The remaining two leak paths are still subject to the separation problem in thermal cycling: 1) between the output wire protective member and the second resin member, and 2) between the magnetic pole and the case, further between the bobbin and the case, and further between the bobbin and first resin member. Penetration of corrosive liquids via the leak paths will result in a shorted coil, resulting in sensor failure.

In U.S. Pat. No. 5,278,496, issued to Dickmeyer et al., a variable reluctance sensor is provided having beneficial performance characteristics. Nonetheless, it would be desirable to further improve upon this design by providing a similarly functioning sensor device which, amongst other things, is composed of fewer parts to thereby simplify the assembly process.

Consequently, a need exists for a more readily assembled variable reluctance sensor capable of high reliability, not subject to encapsulation damage and impervious to liquid intrusion while maximizing output capability per sensor package volume.

SUMMARY OF THE INVENTION

The present invention provides a sensor housing that completely encases the operative components of the sensor to prevent liquid intrusion without resorting to potentially damaging encapsulation or assembly-complicating seals. The sensor accommodates an axially extended pole piece, thereby achieving better performance characteristics than a similar sensor with a shorter piece. The sensor also has a keyed assembly for ensuring that the sensor will be properly oriented when installed.

In one form thereof, the present invention provides a sealed variable reluctance magnetic sensor for use with a submersible connector. The sensor comprises a connector member electrically connectable to the submersible connector. The connector member comprises output conductors for transmitting an electrical signal to the submersible connector. The sensor further comprises a bobbin portion interconnected with the connector member. The bobbin portion includes a barrel having a bore extending through its axial length. A pole piece is disposed within the barrel bore and extends beyond the end and into the connector. A magnet is secured to the bobbin portion adjacent the pole piece. An electric coil is wound around the barrel and electrically connected to the output conductors. An outer hollow housing surrounds the bobbin portion of the sensor and includes an open proximal end portion that is sealingly connectable to the connector member. The housing further includes a distal end portion having a continuous distal end wall forming a closed hollow.

In another embodiment thereof, the present invention provides a sealed variable reluctance magnetic sensor comprising a cover component and a bobbin portion including a barrel having a bore extending therethrough. A pole piece is provided in the barrel bore, and a magnet is disposed at one end of the pole piece. An electric coil is wound around the barrel and is electrically connected to output conductors for transmitting an electrical signal to an output device. The sensor further includes an outer hollow housing surrounding the bobbin portion. The housing includes an open proximal end portion that is sealingly coverable by the cover component. The housing further includes a distal end portion having a continuous distal end wall forming a closed hollow. The housing further comprises one of a projecting key and a key receiving recess. The other end of the projecting key and the key receiving recess are structured and arranged to engage with the bobbin when the bobbin portion is properly aligned and inserted into the hollow housing during assembly.

An advantage of the variable reluctance sensor of the present invention is that the sensor housing surrounding the bobbin is non-apertured at its sensing end, and therefore additional seals which otherwise complicate sensor assembly are eliminated.

Another advantage of the sensor of the present invention is that the use of an elongated pole piece improves both sensor performance and the rigidity of the sensor.

Still another advantage of the sensor of the present invention is the keyed interconnection of its components, which ensures that the assembled sensor will be properly configured for installation.

DESCRIPTION OF THE PREFERRED EMBODIMENTS

Figure 1:
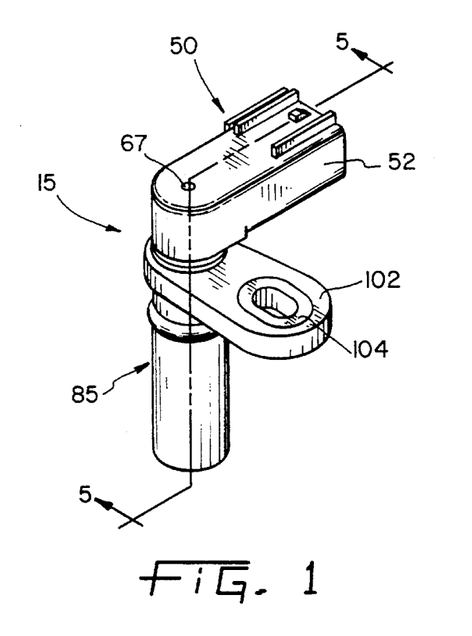
FIG. 1 is a perspective view of a fully assembled variable reluctance sensor in accordance with an embodiment of the present invention.

Referring to FIG. 1, there is shown a perspective view of a variable reluctance sensor device 15 in accordance with the principles of the present invention that is fully assembled and ready for installation. Sensor device 15 is similar in many respects to the designs disclosed in U.S. Pat. No. 5,278,496, which is expressly incorporated herein by reference. To facilitate the description of the components comprising sensor device 15, the following description will generally proceed in the order in which sensor device 15 is assembled.

Figure 2:
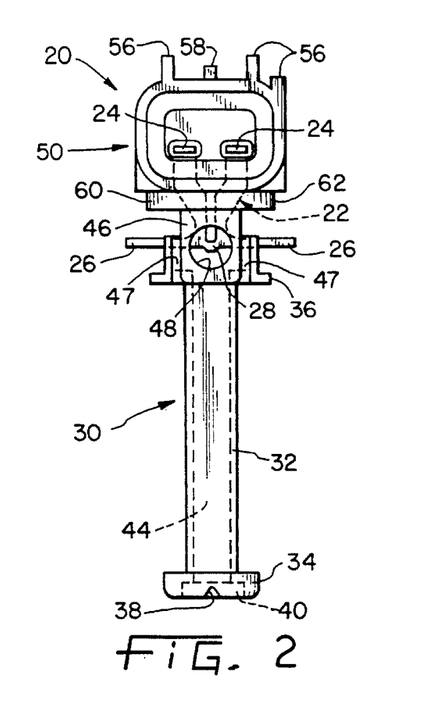
FIG. 2 is an elevational side view of the bobbin/connector assembly of the sensor of FIG. 1 with the terminal insert molded therein and at a manufacture stage prior to terminal bending and shearing.
Figures 3, 4:
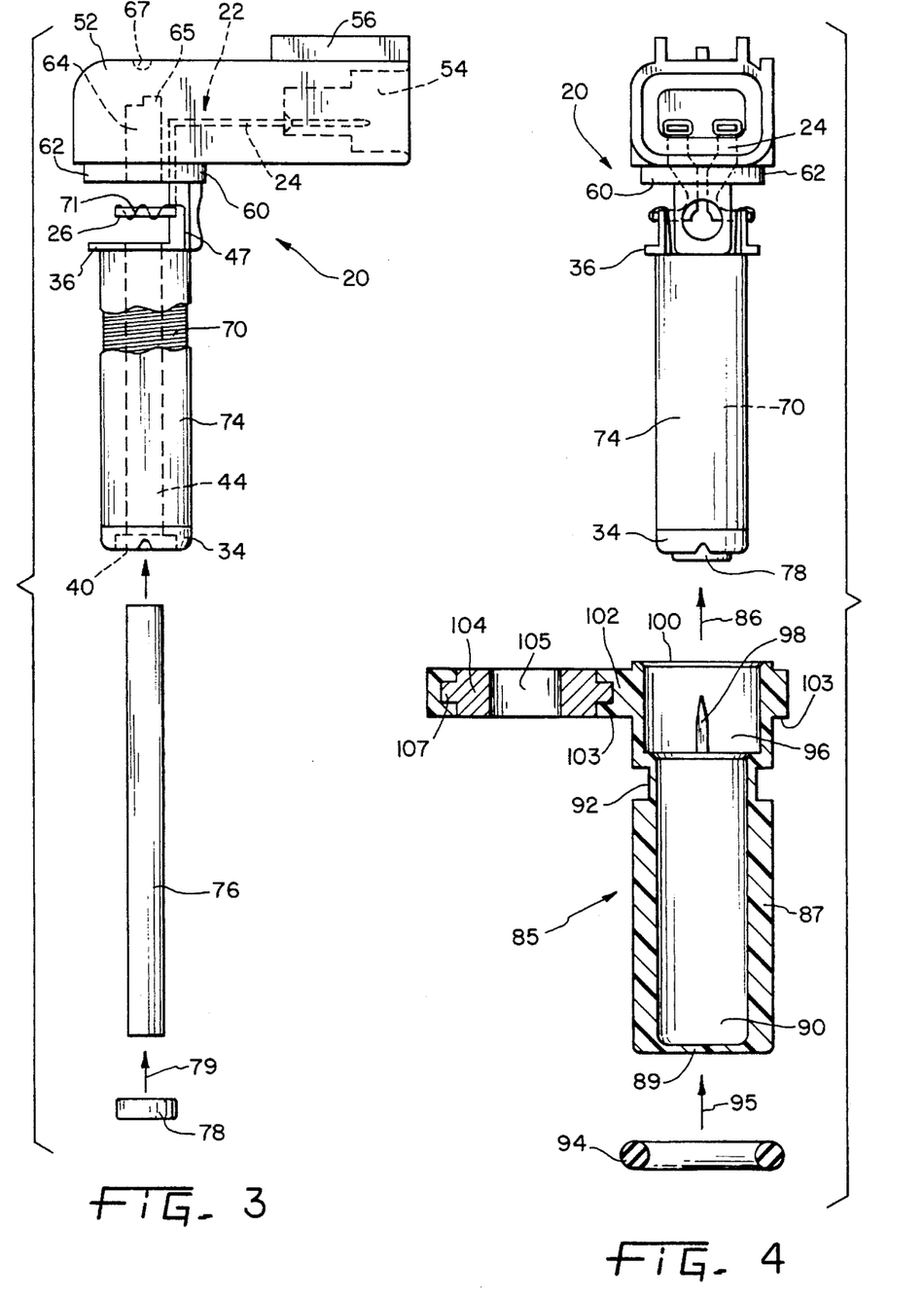
FIG. 3 is a front elevational view of the bobbin/connector assembly of the sensor of FIG. 1 with the magnet wire wrapped around the bobbin barrel, and further including a pole piece and associated magnet being inserted into the bobbin/connector assembly.
FIG. 4 is a side elevational view of the bobbin/connector assembly with the inserted pole piece and magnet of FIG. 3, and wherein the sensor housing and workpiece seal into which the assembly inserts are shown in longitudinal cross-section.

Referring to FIGS. 2 and 3, there are shown in side and front views, respectively, and at successive stages of assembly a bobbin/connector assembly 20 with installed output conductors or terminals. In particular, the configuration of bobbin/connector assembly 20 in FIG. 2 exists immediately after the preferred insert molding of the one-piece stamping 22, used to form the separate terminals, and before terminal adjustment and the provision of magnet wire described further below.

Stamping 22 forms angled terminal blades 24 and, as shown in FIG. 2, laterally projecting terminal legs 26. Stamping 22 is made of a CA260 brass frame which is first plated with copper and then plated with tin. A 50 to 150 micro inches copper plating of the brass prevents zinc migration and improves tin adhesion. The subsequent 300 to 400 micro inches of matte finish tin improves solderability and shelf life. Spanning terminal legs 26 of stamping 22 is web portion 28, which facilitates insert molding the requisite terminals into bobbin/connector assembly 20.

Referring to FIG. 2, bobbin/connector assembly 20 includes a bobbin portion 30 and a customer connector portion 50 which are bridged by shank or beam member 46. Bobbin/connector assembly 20 is preferably molded in a single piece from a polyether-imide, such as Ultem™ 2200 commercially available from General Electric. Other thermoplastic materials may also be employed to construct assembly 20. Bobbin portion 30 includes bobbin barrel 32 around which magnet wire is wound. Bobbin barrel 32 is delimited at its opposite ends by bottom or distal flange 34 and top or proximal flange 36. As used herein, distal and proximal reference the locations of the sensor components relative to the customer connector portion 50. Along its axial length from proximal flange 36 to distal flange 34, bobbin barrel 32 tapers down in diameter and is consequently frustoconical in shape. The tapering of barrel 32 advantageously results in reduced shear stress during molding.

The bottom surface of distal flange 34 is slightly convex and is furnished with a pair of notches 38, which are spaced 90° apart around the radial periphery. Notches 38 are provided as a means by which bobbin portion 30 can be located and held to facilitate winding of magnet wire 70. A cylindrical recess 40 in flange 34 defines a pocket for reception of a magnet. Proximal flange 36 is partially defined by the distal face of beam member 46 and includes notches aligned with slots 47 formed in beam member 46 for passage of the magnet wires. Flange 36 also includes a keyed notch 42 (See FIG. 6) allowing for alignment of the sensor housing described further below. Axially extending completely through bobbin barrel 32 and distal and proximal flanges 34, 36 is bore 44, which is of uniform diameter along its axial length.

Still referring to FIGS. 2 and 3, a single output customer connector portion 50, which is also known as a harness holder, is used to attach a mating submersible connector (not shown). The connector sealingly mates with the harness holder in fluid-tight manner to provide a rear seal. In the illustrated embodiment, customer connector portion 50 is substantially orthogonally arranged relative to bobbin portion 30 and includes a solid body 52 with a stepped cavity 54 into which project the ends of terminal blades 24. Multiple rails 56 and a latching projection 58 are provided on the exterior surface of body 52 to respectively align and latch a mating submersible connector which inserts into stepped cavity 54 for attachment to sensor device 15. A cylindrical boss 60 is positioned on body 52 in axial alignment with bobbin portion 30. Boss 60 is connected to the end of beam member 46 and includes a radial periphery 62. A closed-end cavity 64 used for pole piece securement is formed through boss 60 and into body 52. Cavity 64 is cylindrically shaped and has a diameter slightly less than the diameter of bobbin barrel bore 44. Cavity 64 is also axially aligned with bobbin barrel bore 44. A hollow 65 is provided at the inboard end of cavity 64. A concave dimple 67 (FIG. 1) formed in body 52 is aligned with barrel bore 44 and can be used to rotatably mount bobbin/connector assembly 20 to, along with hollow 65 and notches 38, facilitate winding of magnet wire 70. The overall configuration of customer connector portion 50 can be adapted in shape and arrangement within the scope of the invention to accommodate differently configured or oriented connectors. For example, in other applications body 52 can be coaxial with or otherwise angled from bobbin portion 30.

Stamping 22 is insert molded into bobbin/connector assembly 20 to secure the terminals in a proper configuration. Stamping provides an electrical connection for an electrical conductor. In particular, the mold includes an opening in which stamping 22 rests. The mold is then closed over stamping 22, and the plastic is shot into the mold to form the desired configuration and thereby embed stamping 22 within body 52. Web portion 28 allows stamping 22 to be loaded into the mold as a single piece and eliminates the need to align separate terminals into the mold, thus resulting in an efficient and convenient loading of the terminals during molding of the assembly.

After stamping 22 is so molded within bobbin/connector assembly 20, web portion 28 is exposed through opening 48 provided through beam member 46 (FIG. 2). Web 28 is then sheared out as shown in FIG. 4 in order to effect a separation of stamping 22 into a pair of unconnected terminals. During shearing, the terminal legs 26 which are outwardly splayed as shown in FIG. 2 are simultaneously bent into an operational position shown in FIGS. 3 and 4. A suitable operational position is about 83°±7° from their outwardly splayed arrangement. This position provides proper clearance between pole piece 76 and sensor housing 85 described below. At this position, the legs are allowed to receive magnet wire coil ends and later yet be soldered.

Referring to FIGS. 3 and 4, magnet wire 70 is wound around the length of bobbin barrel 32 between flanges 34, 36. Start and finish wire end sections 71 of coil 70 are placed into beam member wire slots 47 and spiral wrapped upon terminal legs 26. Wire slots 47 offer protection to wire end sections 71 by preventing nicks during wire coiling and by protecting the wire from damage during further device assembly. Flange 36 has a greater diameter than flange 34 to allow the notching of flange 36 that provides a larger target for insertion of wire end sections 71 into slots 47. Magnet wire 70 preferably ranges from 38 to 40 gauge, and is more preferably 38 gauge.

After their wrapping around terminal legs 26, wire end sections 71 and legs 26 are soldered in a dip solder process.

Then, magnet wire coil 70 is wrapped with a material to protect the strands of the magnet wire from damage during subsequent handling involved in manufacture. A polyimide film 74 (e.g. Kapton™ available from DuPont) with an acrylic adhesive is preferred as a wrapping material over a glass cloth or a PTFE (e.g. Teflon™) tape due to its resistance to fraying and stretching. Kapton film tape 74 permits expansion and contraction of magnet wire 70 at its own rate during thermal cycling and will not degrade at high temperatures.

As shown in FIG. 3, pole piece 76 is inserted through bobbin barrel bore 44 and into body cavity 64. Pole piece 76 is constructed of a mechanically and magnetically soft ferrous material which is of low coercive force and high permeability, such as 1008 cold rolled steel. Pole piece 76 is cylindrically shaped with uniform diameter along its axial length and with break edges at its axial ends. Pole piece 76 is sized slightly smaller, such as 0.001 inch, than the inner diameter of barrel bore 44 so as to slip fit therethrough. The diameter of pole piece 76 is also slightly larger, such as 0.001 inch, than the inner diameter of body cavity 64 so as to press fit therein. This extended pole piece configuration adds strength and rigidity to sensor device 15 while improving output performance. In particular, the stresses involved in retaining pole piece 76 are in effect transferred from barrel 32 to body 52, which by design is more substantial in construction. Further, pole piece 76, is lengthened over that shown in U.S. Pat. No. 5,278,496 to provide increased sensitivity. After insertion of pole piece 76, a button-shaped magnet 78 is inserted into magnet pocket 40 in the direction indicated by arrow 79. Magnet 78 is preferably a rare earth magnet such as samarium cobalt. After magnet placement, bobbin/connector assembly 20 is configured as shown in FIG. 4 and is ready to be sealingly received within sensor housing 85.

Figures 5, 7:
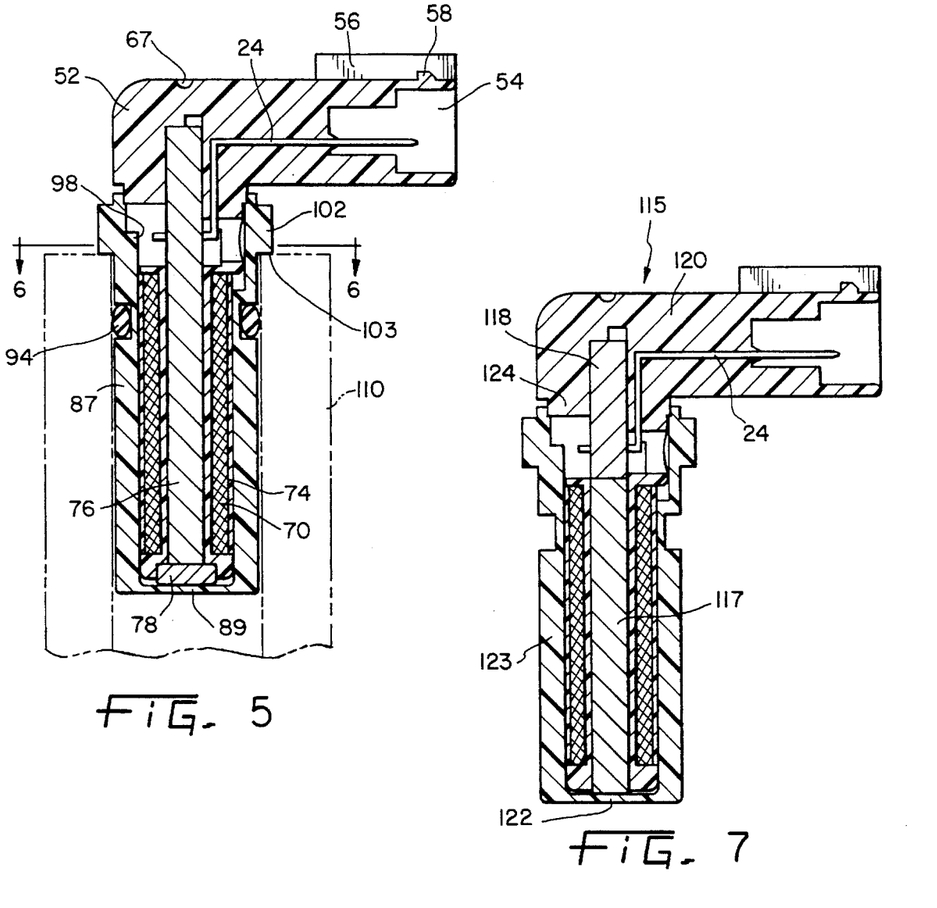
FIG. 5 is a front cross-sectional view, taken along line 5—5 in FIG. 1, of the fully assembled variable reluctance sensor operationally installed on a workpiece shown in dashed lines.
FIG. 7 is a front elevational view of an alternate embodiment of the variable reluctance sensor shown in FIGS. 1–6, wherein the magnet and pole piece disposed in alternative locations are shown in section.

Referring now to its cross-sectional view in FIG. 4, sensor housing 85 may be molded as a single piece from the same material as bobbin/connector assembly 20, and is shown having an optional mounting insert 104 molded therein. Sensor housing 85 is of a closed tubular shape and includes a cylindrical sleeve body 87. Bottom or end wall 89, which is continuous or non-apertured so as to be liquid impervious, closes off the bottom portion of sleeve 87 to define the closed nose or end of a first interior cylindrical hollow 90. First hollow 90 is sized to closely accommodate distal flange 34 and magnet wire coil 70 when bobbin/connector assembly 20 is inserted into hollow 90. Groove 92 circumferentially extends around sleeve 87 and receives a seal, such as a fluorocarbon O-ring 94, inserted along arrow 95. As shown in FIG. 5, O-ring 94 is intended to be compressed to provide a fluid-tight seal between workpiece 110 and sleeve body 87. Provided within an upper portion of sleeve body 87 is an open-ended second hollow 96. Annular chamfered surface 100 is formed at the top of the upper portion of sleeve body 87 and is positioned at the mouth of second hollow 96. At its bottom end toward hollow 96, chamfered surface 100 has an inner diameter smaller than the diameter of body boss 60. At its top end, chamfered surface 100 has an inner diameter larger than the diameter of body boss 60. As a result, when brought together boss 60 abuts against surface 100 to be welded thereto as described below. Second hollow 96 opens into first hollow 90 and has a larger diameter than hollow 90 to allow insertion of flange 36. The interior surface defining second hollow 96 includes an axially aligned projecting key or rib 98 used in orienting sensor housing 85 for securement to bobbin/connector assembly 20. Although shown as cylindrical in exterior shape, sleeve 87 may be alternatively configured to better adapt to its intended environment.

Figure 6:
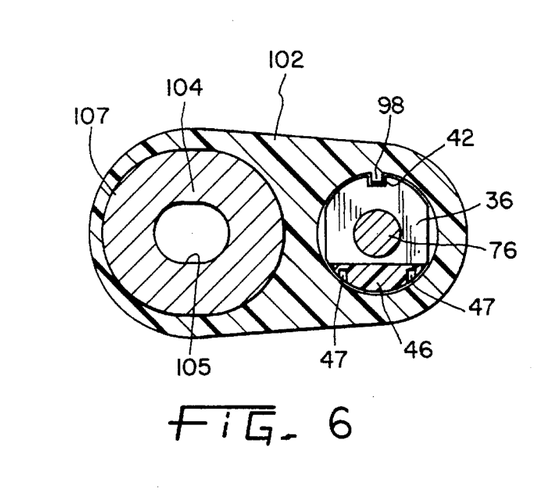
FIG. 6 is a cross-sectional view taken along line 6—6 of FIG. 5.

With reference to FIGS. 4-6, laterally extending from the proximal portion of housing sleeve 87 is a mounting plate, generally designated 102. Mounting plate 102 is molded around a premanufactured metal insert 104 having a central hole 105. The molded material forming mounting plate 102 solidifies on opposite sides of a circumferential, radially projecting ear 107 on insert 104 to securely hold insert 104. As shown in FIG. 5, the bottom, planar surface 103 of plate 102 abuts a workpiece 110 shown in dashed lines upon which sensor device 15 may be operationally mounted, and a known fastener can pass through insert 104 to install sensor device 15 to workpiece 110.

Attachment of housing 85 to assembled bobbin/connector assembly 20 begins by moving sensor housing 85 upwardly in the direction of arrow 86 in FIG. 4 such that flange 34 inserts into top hollow 96 and then bottom hollow 90. Both the pole piece 76 and magnet 78 are "proud" with respect to front flange 34. In other words, pole piece 76 and magnet 78 extend forwardly a distance greater than the tolerance stack-ups. Consequently, as sensor housing 85 is moved upwardly, bottom or end wall 89 engages magnet 78 and forces the back end of pole piece 76 slightly further into body cavity 64. This process ensures that magnet 78 is in engagement with both pole piece 76 and wall 89 upon final assembly, thereby minimizing the distance between the magnet and target. This method requires no measuring to take place prior to the final weld. Also, in this method no cold tool staking is necessary.

To complete insertion, proper rotational orientation of housing 85 relative to assembly 20 is required as key 98 must be aligned with keyed notch 42 on flange 36. This keyed engagement, which could alternatively be provided such as by a key on the exterior of the hollow housing which mates which a notch on connector body 52, ensures that the opening of the submersible connector will be in a selected orientation when sensor device 15 is installed. As insertion continues, chamfered surface 100 contacts body boss 60. As this occurs, radial periphery 62 of boss 60 is ultrasonically welded to sleeve 87 to thereby create a shear joint which is 360° of melted plastic. The reach or length dimension of sensor housing 85 is selected such that the distal face of magnet 78 is flush with the interior surface of end wall 89 upon completion of the ultrasonic welding.

It is recognized that the instant sensor housing design allows different length bobbins to be housed by furnishing housings having different reaches. As all these housings may utilize the same technique of attachment to bobbin/connector assembly 20, modularized tooling is possible.

Referring now to FIG. 7, there is abstractly shown in partial cross-sectional view an alternate embodiment of the sensor device of FIGS. 1-6. Sensor 115 is substantially similar to sensor device 15 except that pole piece 117 and magnet 118 are in reverse order within the bobbin portion. In particular, magnet 118 extends into the cavity provided in the base region of connector body 120, and the distal end of pole piece 117 abuts the inner surface of bottom wall 122.

Figure 10:
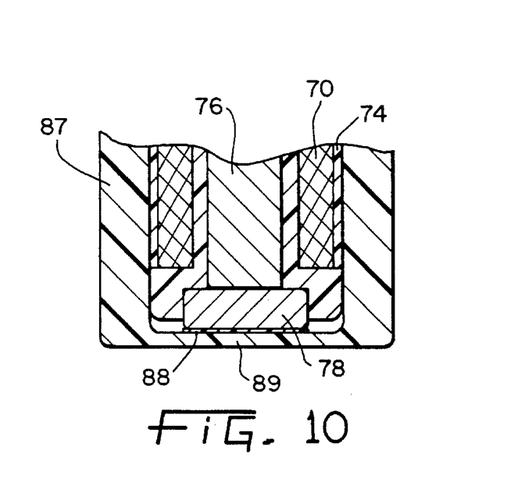
FIG. 10 is an enlarged partial sectional view of the front end of an assembled variable reluctance sensor, showing the magnet and front wall of the bobbin being separated by a small silicon barrier.

To ensure that cracking does not occur in magnet 118 during ultrasonic welding of sleeve body 123 to connector boss 124, an energy absorbing layer in the form of a "dot" 88 is placed over magnet 78, as shown in FIG. 10. Dot 88 may be made of silicon or another suitable material.

Figure 8:
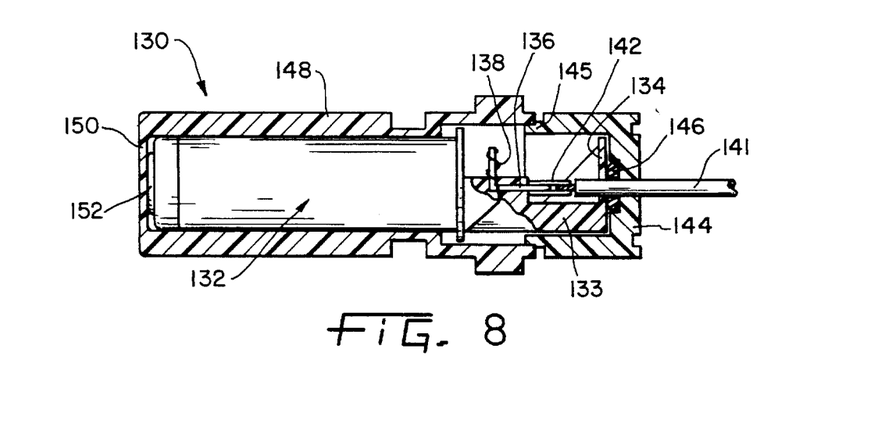
FIG. 8 is an elevational view in partial cross-section of an alternate embodiment of a variable reluctance sensor, and in particular showing a leaded sensor design.

Referring now to FIG. 8, a leaded sensor embodiment of the present invention in shown in partial cross-section. Leaded sensor 130 includes a magnet wire and tape wrapped bobbin portion, generally designated 132, which is integrally formed with an axially arranged terminal mounting component 133. Embedded within component 133 are a pair of generally L-shaped terminals 136 electrically connected to the end sections 138 of the magnet wire wrapped around bobbin portion 132. Integrally formed with component 133 is a disk-shaped flange 134 centered along the longitudinal centerline of bobbin portion 132. The forward ends of a pair of electric leads 141 are connected to respective terminals 136 by crimping tangs 142 attached to terminals 136.

Mounted over the rearward end of terminal mounting component 133 is rear cap piece 144. Custom seals 146 mounted around each lead 141 between disk-shaped flange 134 and rear cap piece 144 are received within individual cavities in rear cap piece 144. The forward annular lip 145 of rear cap piece 144 is then ultrasonically welded around its radial periphery to close-ended hollow housing 148 into which bobbin portion 132 has been inserted. Cap piece 144 and sensor housing 148 become substantially integral by the welding process. The sensor device components are designed such that during ultrasonic welding, the non-apertured end wall 150 of sensor housing 148 is drawn into contact with magnet 152 mounted at the forward end of bobbin portion 132, and seals 146 are compressed between disk-shaped flange 134 and rear cap piece 144 to create a fluid-tight seal around leads 141.

Figure 9:
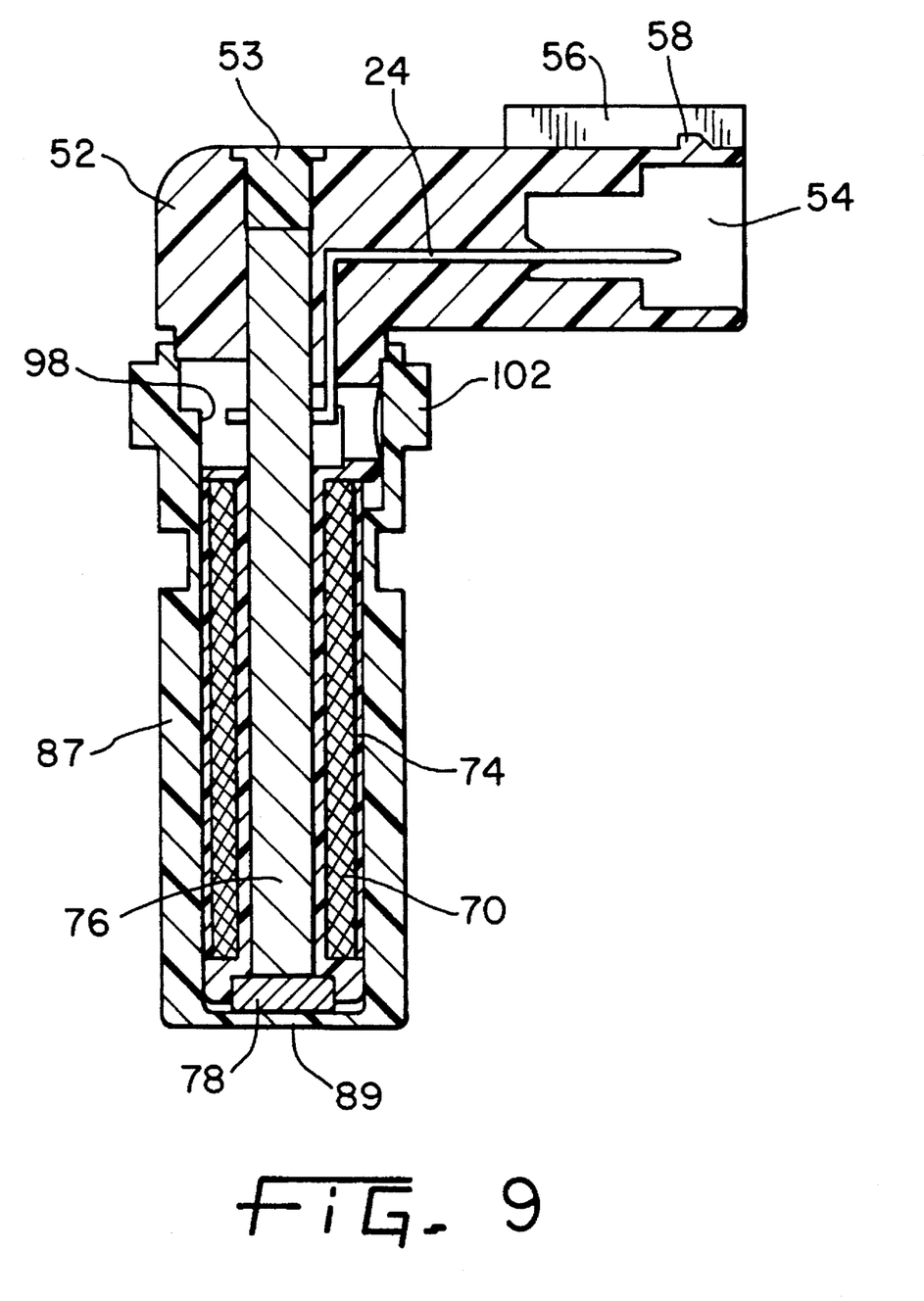
FIG. 9 is a sectional view of an alternative embodiment to the sensor of FIGS. 1–6.

Referring to FIG. 9, another embodiment of the present invention is shown. In this embodiment, cavity 64 extends completely through body 52. The pole piece 76 and magnet 78 are forced forwardly until magnet 78 engages end wall 89 by pushing a plug or insert 53 into cavity 64. Plug 53 is then ultrasonically welded to body 52 to form a hermetic shear joint.

It is recognized that in addition to the variable reluctance sensors described, aspects of the invention can also be applied to other tubular packaged sensors or switches.

It will be appreciated that the foregoing is presented by way of illustration only, and not by way of any limitation, and that various alternatives and modifications may be made to the illustrated embodiments without departing from the spirit and scope of the invention.

What is claimed is:

1. A sealed variable reluctance sensor for use with a submersible connector, comprising:

a connector member electrically connectable to the submersible connector, said connector member comprising output conductors for transmitting an electrical signal to the submersible connector, said connector-member further comprising a body having a cavity therein;

a bobbin portion interconnected with said connector member, said bobbin portion including a barrel having an axial length and opposite ends, said opposite ends including a first proximal end relative to said connector member and a second distal end relative to said connector member, said barrel including a bore extending through said barrel axial length;

a pole piece disposed within said barrel bore and extending beyond said first proximal end, said pole piece including a distal end and a proximal end, said pole piece proximal end being within said cavity;

a magnet secured to said bobbin portion adjacent said pole piece, said magnet disposed at said pole piece distal end;

an electric coil wound around said barrel and electrically connected to said output conductors;

an outer hollow housing surrounding said bobbin portion, said housing including an open proximal end portion sealingly connectable to said connector member, said housing further including a distal end portion having a continuous distal end wall forming a closed hollow; and an acoustic energy absorbent element disposed between said magnet and said distal end wall, wherein said magnet is disposed between said acoustic energy absorbent element and said pole piece distal end.

2. The sensor of claim 1, wherein said bobbin portion and said connector member are integrally formed, wherein said output conductors comprise first and second terminals insert molded into said connector member, and wherein first and second conducting wires of said coil are connected to respective said first and second terminals.

3. The sensor of claim 1, wherein said pole piece and said barrel bore are cooperatively structured such that said pole piece slip fits within said barrel bore and press fits into a cavity in said second distal end.

4. The sensor of claim 3, wherein said pole piece comprises a constant diameter along its axial length.

5. The sensor of claim 1, wherein said housing open proximal end portion and said connector member are ultrasonically welded together.

6. The sensor of claim 1, wherein said bobbin portion further comprises one of a projecting key and a key receiving recess, wherein said hollow housing comprises an interior surface having the other of a projecting key and a key receiving recess, wherein said projecting key and said key receiving recess are structured and arranged to engage when said bobbin portion is properly aligned and inserted into said hollow housing during assembly.

7. The sensor of claim 1, wherein said connector member further comprises a hollow at an inboard end of said pole piece receiving cavity.

8. The sensor of claim 1, further comprising at least one protective layer wrapped around said coil.

9. The sensor of claim 8, wherein said protective layer comprises a polyimide film.

10. The sensor of claim 1, wherein said bobbin portion further comprises a flange transversely arranged relative to said bobbin portion barrel at said barrel distal end, wherein said flange further comprises at least one notch.

11. The sensor of claim 1, further comprising means for mounting said housing to a workpiece.

12. The sensor of claim 1, wherein said connector member and said bobbin portion are integrally constructed.

13. A sealed variable reluctance sensor, comprising:

a cover component;

a bobbin portion including a barrel having opposite ends, said barrel comprising a pole piece receiving bore, said opposite ends including a first proximal end relative to said cover component and a second distal end relative to said cover component;

a pole piece provided in said barrel bore and comprising first and second ends;

a magnet disposed at said pole piece first end;

an electric coil wound around said barrel and electrically connected to output conductors for transmitting an electrical signal to an output device;

an outer hollow housing surrounding said bobbin portion, said housing including an open proximal end portion sealingly coverable by said cover component, said housing further including a distal end portion having a continuous distal end wall forming a closed hollow, said housing further comprising one of a projecting key and a key receiving recess;

an acoustic energy absorbing element disposed between said magnet and said distal end wall, wherein said magnet is disposed between said acoustic energy absorbing element and said pole piece first end;

the other of said projecting key and said key receiving recess associated with said bobbin portion, wherein said projecting key and said key receiving recess are structured and arranged to engage when said bobbin portion is properly aligned and inserted into said hollow housing during assembly.

14. The sensor of claim 13, wherein said one of a projecting key and a key receiving recess of said housing comprises a radially inwardly projecting key formed on a hollow defining surface of said housing.

15. The sensor of claim 13, wherein said cover component comprises a body having a pole piece receiving cavity, and wherein said pole piece second end is sized to press fit within said pole piece receiving cavity.

16. The sensor of claim 13, wherein said cover component and said outer hollow housing are ultrasonically welded together.

17. A sealed variable reluctance sensor, comprising:

a bobbin portion including a barrel having a bore, said barrel further comprising front and rear ends;

a pole piece provided in said bore;

a magnet secured to the bobbin portion adjacent and in front of the pole piece at the front end of the barrel;

an electric coil wound around the barrel;

an outer hollow housing surrounding said bobbin portion, said housing including an open rear end portion, said housing further including a front end portion having a continuous front end wall forming a closed hollow;

an acoustic energy absorbing element disposed between said magnet and said continuous front end wall, wherein said magnet is adjacent said acoustic energy absorbing element and in front of said pole piece at said front end of said barrel;

a cover piece covering the open rear end portion of the hollow housing and including at least one opening therein;

a pair of electrical output leads extending through said at least one opening in said cover piece and secured to a rear portion of said bobbin portion, wherein ends of said electric coil are electrically secured to said electrical leads;

at least one elastomer lead seal disposed between said cover piece and said bobbin portion and being axially compressed by said cover piece for sealing said at least one cover piece opening from fluid flow therethrough, said leads passing through and being sealed against said at least one lead seal.

18. A sealed variable reluctance sensor, comprising:

a bobbin including a barrel portion having a cavity therein, a rear end, and a front end including a front flange;

a pole piece in said cavity;

a magnet secured to said bobbin adjacent said pole piece, said magnet being disposed in front of said pole piece at the front end of said bobbin;

an electric coil wound around said barrel portion and electrically connected to output conductors for transmitting an electrical signal to an output device;

an outer hollow shell surrounding said bobbin and including an open rear end portion and a front end portion having a front wall, said front end of said hollow shell being closed to seal said electric coil from fluid flow through the front of the sensor;

an acoustic energy absorbing element compressed between said magnet and said front wall, wherein said magnet is disposed adjacent said acoustic energy absorbent element and in front of said pole piece at said front end of said bobbin; and a rear piece covering said open rear end portion of said hollow shell, wherein said rear piece is ultrasonically welded to a surface of said rear end portion of said hollow shell to seal said electric coil from fluid flow through said rear end portion.

19. The sensor of claim 18, wherein said energy absorbing element is made of silicon.

20. A sealed variable reluctance sensor, comprising:

a bobbin assembly including a front barrel portion and a rear body portion, said bobbin including a cavity extending completely through both said front barrel portion and said rear body portion, said cavity having a front cavity portion and a rear cavity portion, said front barrel portion including a front end including a front flange;

a pole piece in said cavity;

a magnet secured to said bobbin adjacent said pole piece, said magnet being disposed in front of said pole piece at the front end of said bobbin;

an electric coil wound around said barrel portion and electrically connected to output conductors for transmitting an electrical signal to an output device; and an outer hollow shell surrounding said bobbin and including an open rear end portion and a front end portion having a front wall, said front end of said bobbin and said hollow shell being sealed to seal said electric coil from fluid flow through the front of the sensor;

an acoustic energy absorbent element disposed between said magnet and said front wall, wherein said magnet is disposed directly adjacent said acoustic energy absorbing element and in front of said pole piece at said front end of said bobbin; and wherein said rear body portion of said bobbin assembly covers said open rear end portion of said hollow shell, wherein said rear body portion is ultrasonically welded to a surface of said rear end portion of said hollow shell to seal said electric coil from fluid flow through said rear body portion, said rear body portion including a plug element forced into said rear cavity portion and into engagement with said pole piece, thereby forcing said pole piece and said magnet in the forward direction sufficiently to cause said magnet to engage said front wall of said outer hollow shell.

* * * * *